United States Patent
Ozawa et al.

(10) Patent No.: US 7,835,139 B2
(45) Date of Patent: Nov. 16, 2010

(54) SOLID ELECTROLYTIC CAPACITOR

(75) Inventors: Masato Ozawa, Kyoto (JP); Katsuhisa Ishizaki, Kyoto (JP); Kazuo Kawahito, Osaka (JP); Minoru Omori, Kyoto (JP); Yoshiro Maruhashi, Kyoto (JP)

(73) Assignee: Panasonic Corporation, Osaka (JP)

( * ) Notice: Subject to any disclaimer, the term of this patent is extended or adjusted under 35 U.S.C. 154(b) by 403 days.

(21) Appl. No.: 12/050,388

(22) Filed: Mar. 18, 2008

(65) Prior Publication Data

US 2008/0232027 A1    Sep. 25, 2008

(30) Foreign Application Priority Data

| Mar. 19, 2007 | (JP) | ............................... 2007-070162 |
| Mar. 19, 2007 | (JP) | ............................... 2007-070163 |
| Mar. 19, 2007 | (JP) | ............................... 2007-070164 |
| Mar. 19, 2007 | (JP) | ............................... 2007-070165 |

(51) Int. Cl.
   *H01G 9/00* (2006.01)
(52) U.S. Cl. .................. 361/523; 361/525; 361/528; 361/529; 361/516; 361/517
(58) Field of Classification Search ............... 361/523, 361/525–529, 516–519, 540–541, 508–509; 29/25.01, 25.03

See application file for complete search history.

(56) References Cited

U.S. PATENT DOCUMENTS

| 6,212,063 B1 * | 4/2001 | Johnson et al. ............. 361/517 |
| 6,343,004 B1 * | 1/2002 | Kuranuki et al. ............ 361/523 |
| 6,625,009 B2 * | 9/2003 | Maeda ........................ 361/528 |
| 6,751,086 B2 * | 6/2004 | Matsumoto .................. 361/523 |
| 6,816,358 B2 * | 11/2004 | Kida et al. .................... 361/540 |
| 7,450,366 B2 * | 11/2008 | Kuriyama .................... 361/523 |

FOREIGN PATENT DOCUMENTS

| JP | 2003-045753 | 2/2003 |
| JP | 2003-289023 | 10/2003 |

* cited by examiner

*Primary Examiner*—Nguyen T Ha
(74) *Attorney, Agent, or Firm*—Wenderoth, Lind & Ponack, LLP.

(57) ABSTRACT

Cathode electrode part 5 of flat plate-like element 1 is joined with cathode com terminal 7 with a conductive adhesive or the like. Element mounting part 6a of anode terminal 6 is provided with a pair of joint parts 6b for wrapping anode electrode part 4 from both sides. The tips of joint parts 6b and anode electrode part 4 are joined by laser welding such that the ratio (w/d) of the width (w) of each tip of joint parts 6b and the diameter (d) of the welding trace to be welded is 0.5 to 1.5, and more preferably, 0.5 to 1.25 for providing low ESR means for concentrating the quantity of heat at the time of welding on welding parts 6c without escape. Therefore, a stable welded state is obtained, so that the ESR is improved for achieving low ESR of the solid capacitor.

18 Claims, 14 Drawing Sheets

| Width of tip (A) (mm) | 0.10 | 0.20 | 0.30 | 0.40 | 0.50 | 0.60 | 0.70 |
|---|---|---|---|---|---|---|---|
| Ratio (w/d) | 0.25 | 0.50 | 0.75 | 1.00 | 1.25 | 1.50 | 1.75 |
| Connection resistance value index | 130 | 80 | 67 | 47 | 53 | 80 | 100 |
| Leakage current (μA) | 0.4 | 0.3 | 0.3 | 0.3 | 0.5 | 2.0 | 10.0 |

| Sample | Product of present invention | | Comparative example |
|---|---|---|---|
| | Experiment example 1 | Experiment example 2 | |
| ESR (mΩ) | 3.5 | 3.4 | 5.5 |
| ESR variation (mΩ) | 0.2 | 0.2 | 0.5 |

| Point | A | B | C | D |
|---|---|---|---|---|
| Product of present invention | 110% | 108% | 100% | — |
| Conventional product | 125% | 110% | — | 100% |

SOLID ELECTROLYTIC CAPACITOR

FIELD OF THE INVENTION

The present invention relates in particular to a solid electrolytic capacitor with low impedance characteristics using a conductive polymer as a solid electrolyte, as a capacitor to be used for various kinds of electronic devices.

BACKGROUND OF THE INVENTION

With the current tendency that electronic devices use higher frequencies, a capacitor having better impedance characteristics in a high frequency range than those of the conventional configuration is required also for a capacitor as one of the electronic parts. In order to meet such a demand, various solid electrolytic capacitors using a conductive polymer having high electrical conductivity as the solid electrolyte have been discussed.

Moreover, recently, a small size and a large capacity are strongly demanded for a solid electrolytic capacitor to be used around a CPU of a personal computer. Furthermore, corresponding to the tendency toward higher frequencies, lower ESR (equivalent series resistance) and lower ESL (equivalent series inductance) with good noise removal and transient response properties are required. For responding to the demands, various discussions have been made.

Among them, the periphery of the anode electrode will be discussed first. FIG. 20A is a front cross-sectional view showing the configuration of a conventional solid electrolytic capacitor of this kind, FIG. 20B is a side cross-sectional view on the 20B-20B cross section in FIG. 20A, and FIG. 21 is a plan view of the solid electrolytic capacitor before externally mounting. In FIGS. 20A to 21, flat plate-like element 111 is separated into anode electrode part 114 and cathode forming part (not shown) by providing insulating resist part 113 after forming a dielectric oxide coating film layer by roughing the surface of anode member 112 made of an aluminum foil serving as a valve function metal (valve metal). Then, by successively laminating and forming a solid electrolyte layer made of a conductive polymer and a cathode layer including a carbon layer and a silver paste layer on the dielectric oxide coating film layer of the cathode forming part, cathode electrode part 115 is formed. Thus, there is provided flat plate-like element 111 provided with anode electrode part 114 and cathode electrode part 115 on both the sides in the longitudinal direction with respect to resist part 113.

Anode com terminal (anode terminal) 116 is provided with plane part 116a so as to form connecting part 116b by bending upward both the ends of plane part 116a. With anode electrode parts 114 of a plurality of elements 111 laminated mounted on plane part 116a of anode com terminal 116, connecting parts 116b are bent inward so as to tightly wrap anode electrode parts 114. The tip portions of connecting parts 116b and anode electrode parts 114 of elements 111 are joined by laser welding of welding parts 116c.

Cathode electrode part 115 is mounted on plane part 117a of cathode com terminal 117 such that plane part 117a of cathode com terminal 117 and cathode electrode part 115, and cathode electrode parts 115 of elements 111 are joined and connected with conductive adhesive 118.

A plurality of elements 111 is covered with insulating exterior resin 119 with anode com terminal 116 and cathode com terminal 117 connected therewith exposed partially to the outer surface.

By bending portions of anode com terminal 116 and cathode com terminal 117 exposed from exterior resin 119 along exterior resin 119 toward the bottom surface, there is provided a surface mounting type solid electrolytic capacitor with anode terminal part 116d and cathode terminal part 117b formed in the bottom surface part.

The conventional solid electrolytic capacitor of such a configuration enables stable welding work by the laser welding by directing laser beams simultaneously to the tip of connecting part 116b provided in anode com terminal 116 and anode electrode part 114 of element 111.

As the background art document information in relation to the present invention, for example, Unexamined Japanese Patent Publication No. 2003-289023 is known.

However, according to the above-mentioned conventional solid electrolytic capacitor, anode electrode part 114 of element 111 and anode com terminal 116 are joined by laser welding by directing laser beams simultaneously to the end face of connecting part 116b provided to anode com terminal 116 and anode electrode part 114 of element 111. Therefore, as a first problem, it is difficult to carry out the welding work by providing an equal quantity of heat to all laminated elements 111 because of partial escape of the quantity of heat at the time of welding, to anode com terminal 116 via connecting part 116b. Therefore, even though the welding strength is ensured, because of generation of irregularity in the welded state, the ESR was deteriorated due to the presence of a too-much-welded portion or a portion insufficiently welded.

Moreover, as a second problem, since the dielectric oxide coating film layer is formed on the surface of anode electrode part 114 of element 111, irregularity can easily be generated in the welding work. Therefore, as shown in detail in FIG. 22, the lower layer of elements 111 laminated in plurality can hardly be welded, so that the entirety can hardly be welded evenly, and thus the ESR was increased.

Moreover, as a third problem, sputter may be generated at the time of welding by laser mentioned above, and the generated sputter is scattered in the periphery. Therefore, if the above-mentioned sputter is scattered onto insulating resin part 113 provided for the insulation between anode electrode part 114 and cathode electrode part 115, the insulation property deteriorates, and thereby, the ESR is increased. In the worst case of having a large size of, or a large amount of, sputter scattered onto insulating resin part 113, there was a risk of short-circuit due to the breakage of insulation between anode electrode part 114 and cathode electrode part 115.

Next, the periphery of the cathode electrode will be discussed.

FIG. 23 is a perspective view showing the configuration of a conventional solid electrolytic capacitor of this kind, and FIG. 24 is a plan view showing the configuration of an element to be used for the solid electrolytic capacitor. In FIGS. 23 and 24, first, after forming a dielectric oxide coating film layer by roughing the surface of an anode member (not shown) made of an aluminum foil serving as a valve function metal, insulating resist part 122 is provided so as to be separated into anode electrode part 123 and cathode forming part (not shown). Thereafter, by successively laminating and forming a solid electrolyte layer made of a conductive polymer and a cathode layer including a carbon layer and a silver paste layer on the dielectric oxide coating film layer of the cathode forming part, cathode electrode part 124 is formed. Thus, there is provided flat plate-like element 121 provided with anode electrode part 123 and cathode electrode part 124 via resist part 122 in the longitudinal direction.

Anode electrode parts 123 of a plurality of elements 121 mounted on anode com terminal 125 are joined by means of laser welding or the like.

Bent parts 126a are formed by bending upward both the sides of the element mounting portion of cathode com terminal (cathode terminal) 126. The element mounting portion of cathode com terminal 126 and cathode electrode part 124 of element 121, and each cathode electrode part 124 of elements 121 are joined with a conductive adhesive (not shown). Furthermore, the above-mentioned bent part 126a and cathode electrode part 124 are electrically connected with conductive adhesive 127.

The plurality of elements 121 is covered integrally with insulating exterior resin 128 with the above-mentioned anode com terminal 125 and cathode com terminal 126 are both exposed partially to the outer surface. By bending portions of anode com terminal 125 and cathode com terminal 126 exposed from exterior resin 128 along exterior resin 128 toward the bottom surface, a surface mounting type solid electrolytic capacitor with the anode terminal part and the cathode terminal part formed in the bottom surface part is provided.

According to the conventional solid electrolytic capacitor of such a configuration, bent parts 126a are provided by bending upward both the sides of the element mounting portion of cathode com terminal 126, and bent parts 126a and cathode electrode parts 24 of elements 121 are connected with conductive adhesive 127. Thus, since the internal resistance of the entirety at the time of laminating elements 121 can be reduced, low ESR can be achieved.

As the background art document information in relation to the present invention, for example, Unexamined Japanese Patent Publication No. 2003-74753 is known.

However, according to the conventional solid electrolytic capacitor described with reference to FIGS. 23 and 24, low ESR is achieved by reducing the internal resistance by connecting cathode electrode parts 124 of a plurality of laminated elements 121 and bent parts 126a of cathode com terminal 126 via conductive adhesive 127. However, as a fourth problem, since the ESR value of the element 121 main body is high, a problem occurs that a further lower ESR demanded from the market cannot be sufficiently achieved. The reason therefor will be explained hereinafter with reference to FIG. 25.

FIG. 25 is a plan view showing a main part of the process of forming a solid electrolyte layer of conventional element 121 by electrolyte polymerization. In FIG. 25, insulating resist part 122 is first formed on anode member 129 prepared by blanking into a predetermined shape an aluminum foil with the surface roughened and a dielectric oxide coating film layer formed. Resist part 122 separates anode member 129 into anode electrode part 123 and cathode forming part 130. Then, power supply tape 131 is attached to form an electrode for supplying power to the above-mentioned anode member 129. By the electropolymerization by soaking the same into a polymerization vessel (not shown) filled with a polymerization solution and supplying power via power supply tape 131, a solid electrolyte layer made of a conductive polymer is formed on the surface of cathode forming part 130.

Since the production of the solid electrolyte layer in the above-mentioned electropolymerization proceeds along the current flow supplied to cathode forming part 130 via power supply tape 131, the solid electrolyte layer is formed in the order of points A, B, and D shown in the figure.

Therefore, for obtaining a solid electrolyte layer of a desired film thickness, the electropolymerization should be carried out until point D has the desired film thickness. However, at the moment when point D has the desired film thickness, points B and A have a film thickness thicker than that of point D. Therefore, variation in the film thickness of the solid electrolyte layer is generated in cathode forming part 130, so that unnecessary resistance is increased at a portion formed to a film thickness more than necessary, and thus a problem of ESR deterioration occurs.

An object of the present invention is to solve the various kinds of problems of the conventional configurations by providing a solid electrolytic capacitor capable of easily obtaining a stable welded state in the anode electrode part, and suppressing variation in film thickness of the solid electrolyte layer in the cathode forming part, thereby restraining the ESR deterioration to realize the low ESR.

SUMMARY OF THE INVENTION

In order to solve the above-mentioned first problem, the present invention provides a flat plate-like element using a conductive polymer as a solid electrolyte and provided with an anode electrode part and a cathode electrode part via an insulating part, an anode terminal to be joined with the anode electrode part of the flat plate-like element, a cathode terminal to be joined with the cathode electrode part of the flat plate-like element, an exterior resin covering integrally the flat plate-like element, the anode terminal and the cathode terminal with the anode terminal and cathode terminal exposed partially, and a low ESR mechanism relating to conduction of at least either one of the joint between the anode electrode part and the anode terminal and the joint between the cathode electrode part and the cathode terminal.

One low ESR mechanism is provided with a joint part joining the anode electrode part to the anode terminal, wherein the tip of the joint part is joined with a flat portion of the anode electrode part by laser welding, and the ratio (w/d) between the width (w) of the tip of the joint part and the diameter (d) of the welding trace in the laser welding part is 0.5 to 1.5, and further preferably 0.5 to 1.25.

According to the configuration, diffusion of the heat of quantity through the joint part at the time of laser welding can be reduced, and a stable welded state can be obtained because the quantity of heat is concentrated to the welding part; therefore an effect of achieving low ESR by improving the ESR can be obtained.

Next, in order to solve the second problem, the low ESR mechanism of the present invention may include a through hole provided in a portion of the anode electrode part of the flat plate-like element, and the joint part to be joined with a flat portion of the anode electrode part is provided in the anode electrode terminal such that a portion of the molten anode electrode part flows into the through hole by joining the tip of the joint part and the vicinity of the through hole provided in the anode electrode part by laser welding.

According to the configuration, since a portion of the anode electrode melted at the time of welding flows into the through hole to electrically connect the anode electrode parts of the elements with each other, an effect of reducing ESR by joining the entirety of a plurality of laminated elements can be obtained.

In order to solve the third problem, the low ESR mechanism of the present invention may include a joint part provided in the anode terminal for joining with the anode electrode part such that the joint part is provided for covering a portion of the insulating resin part provided between the anode electrode part of the flat plate-like element and the cathode electrode part and joining with a flat portion of the anode electrode part, and a portion of the joint part and the flat portion of the anode electrode part are joined by laser welding.

According to the configuration, even if sputter is scattered at the time of welding, since the insulating resin part is covered with a portion of the joint part, the sputter does not have any influence, so that highly reliable welding can be carried out stably, and the high reliability and the low ESR can be achieved.

In order to solve the fourth problem, the low ESR mechanism of the present invention may include a notch part or a tapered part on both the ends of the end portion of the cathode electrode part in the direction linking the anode electrode part and the cathode electrode part of the flat plate-like element, and a side wall part to be contacted with the side surface of the notch part or the tapered part provided in the cathode electrode part of the element by bending upward both the ends of an element mounting part of the cathode terminal for mounting the cathode electrode part of the element.

According to the configuration, since the time for attaining a desired film thickness of a solid electrode layer is shortened at the time of forming the solid electrolyte layer by electropolymerization, a portion to be formed to a film thickness more than necessary can be reduced at the point where a portion in which the solid electrolyte layer is produced most slowly reaches to the desired film thickness, so that variation in film thickness of the solid electrolyte layer in the cathode forming part can be suppressed, and thus the effect of reducing ESR by preventing increase in unnecessary resistance can be obtained.

As heretofore described, according to the solid electrolytic capacitor of the present invention, by the configurations corresponding to each problem mentioned above, the effect of reducing ESR by joining the entirety of a plurality of laminated elements can be obtained.

DETAILED DESCRIPTION OF THE INVENTION

Exemplary Embodiment 1

Hereafter, a solid electrolytic capacitor according to a first exemplary embodiment of the present invention will be described with reference to the drawings.

Figure 1A:
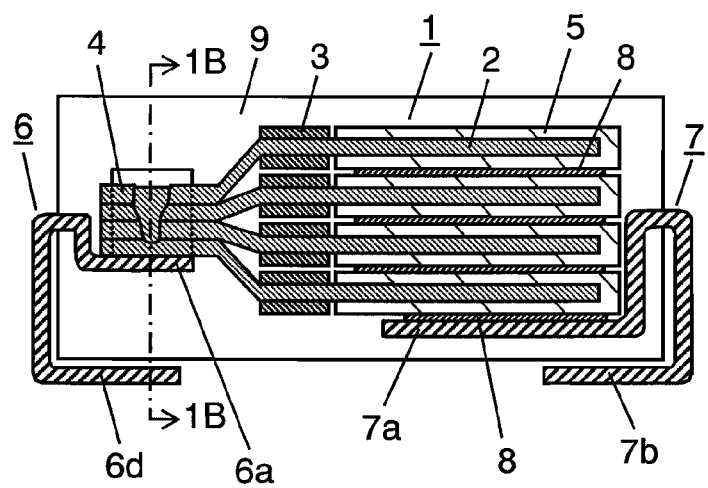
FIG. 1A is a front cross-sectional view showing the configuration of a solid electrolytic capacitor according to a first embodiment of the present invention.
Figure 1B:
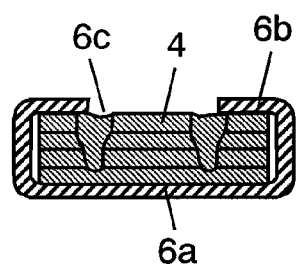
FIG. 1B is a side cross-sectional view taken along the line 1B-1B of FIG. 1A.
Figure 2:
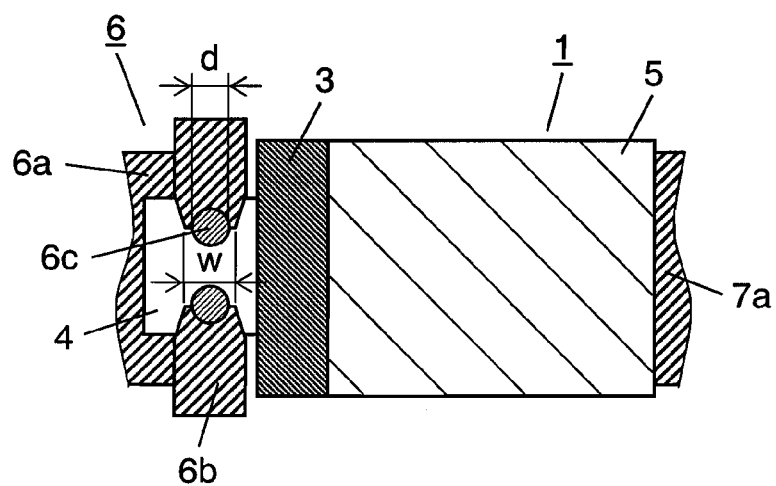
FIG. 2 is a plan view of the solid electrolytic capacitor before external mounting.
Figures 3, 4:
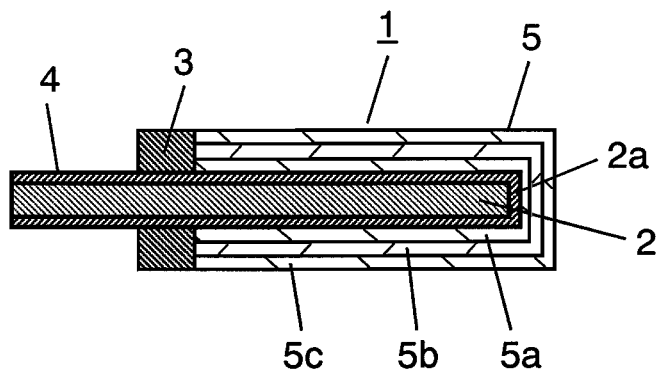
FIG. 3 is a cross-sectional view showing the configuration of an element to be used for the solid electrolytic capacitor.
FIG. 4 is a table showing the characteristics at the time of carrying out welding with the width size of the tip portion of a joint part provided in an anode com terminal changed.

FIGS. 1A and 1B are a front cross-sectional view showing the configuration of a solid electrolytic capacitor in the first embodiment of the present invention and a side cross-sectional view taken along the line 1B-1B, FIG. 2 is a plan view of the solid electrolytic capacitor before external mounting, and FIG. 3 is a cross-sectional view showing the configuration of an element to be used for the solid electrolytic capacitor.

In FIGS. 1A to 3, each element 1 is separated into anode electrode part 4 and a cathode forming part (not shown) by providing insulating resist part 3 made of an insulating resin such as a polyimide resin or a silicone resin after forming dielectric oxide coating film layer 2a by roughing the surface of anode member 2 made of an aluminum foil as a valve function metal (valve metal). Then, by successively laminating and forming cathode layers including solid electrolyte layer 5a made of a conductive polymer, carbon layer 5b, and silver paste layer 5c on dielectric oxide coating film layer 2a of the cathode forming part. In this manner, flat plate-like element 1 including anode electrode part 4 and cathode electrode part 5 provided with respect to resist part 3 in the longitudinal direction is provided.

Anode com terminal (anode terminal) 6 is connected with anode electrode parts 4 of elements 1. Element mounting part 6a for mounting anode electrode part 4 is provided in anode com terminal 6, and a pair of joint parts 6b is formed by bending upward both the ends of element mounting part 6a. Joint parts 6b are formed into a tapered shape so as to have only the tip portions small in width as a low ESR mechanism relating to the conduction of the joint between anode electrode part 4 and anode com terminal 6.

A plurality (in the present embodiment, four pieces) of anode electrode parts 4 of elements 1 is laminated and mounted on element mounting part 6a of anode com terminal 6 having such a configuration. The plurality of laminated anode electrode parts 4 is bound by inwardly wrapping joint parts 6b provided on both the ends of element mounting part 6a from both the sides so as to be each closely contacted with anode electrode parts 4. By directing laser beams using, e.g., YAG laser, to the tip portions formed narrowly of joint parts 6b and a flat portion of the upper surface of anode electrode parts 4 of elements 1, welding parts 6c are joined by laser welding.

Since the plurality of laminated anode electrode parts 4 is bound at joint parts 6b, the joint strength among laminated anode electrode parts 4 is improved so as to reduce the joint resistance.

Cathode electrode parts 5 of elements 1 are connected with cathode com terminal (cathode terminal) 7. Cathode com terminal 7 is provided with element mounting part 7a for mounting cathode electrode part 5 such that element mounting part 7a and cathode electrode part 5, and each of cathode electrode parts 5 of elements 1, are conductively joined with one another.

Elements 1, anode com terminal 6, and cathode com terminal 7 are covered integrally with insulating exterior resin 9 with anode com terminal 6 and cathode com terminal 7 both exposed partially to the outer surface. By bending portions of anode com terminal 6 and cathode com terminal 7 exposed from exterior resin 9 from the side surfaces to the bottom surface along exterior resin 9, a surface mounting type solid electrolytic capacitor with anode terminal part 6d and cathode terminal part 7b formed in the bottom surface part is provided.

In the solid electrolytic capacitor of the present embodiment configured as above, the tip portions of joint parts 6b of anode com terminal 6 to be joined with anode electrode parts 4 of elements 1 by laser welding are formed into a tapered shape so as to have a small width. According to the configuration, the quantity of heat at the time of welding can hardly be escaped from joint parts 6b and is concentrated at welding parts 6c, a stable welded state can be obtained between each anode electrode part 4 and between anode electrode part 4 and welding parts 6c; therefore, a special effect of achieving low ESR by suppressing deterioration of ESR can be provided.

FIG. 4 shows the results of confirmation of characteristics in the case of performing welding with the width size of the tip portions of joint parts 6b provided in anode com terminal 6 changed for the purpose of confirming such an effect.

The solid electrolytic capacitor shown in FIG. 4 has a rated voltage of 2.0 V and a capacitance of 220 μF, and includes four pieces of laminated elements 1, an aluminum foil of 0.1 mm in thickness, and anode com terminal 6 and cathode com terminal 7 of a copper alloy of 0.1 mm in thickness. The ESR at the frequency of 100 kHz of the solid electrolytic capacitor is 4 mΩ to 10 mΩ in the case of the width (w) of each tip of joint parts 6b being 0.7 mm.

The laser welding was carried out at the output of 2 KW, and the diameter (d) of the welding trace at each welding part 6c was constantly 0.4 mm.

Moreover, shown as the connection resistance value index at the tip width (w) of each joint part 6b is the rate of connection resistance value in the case of setting to 100 the connection resistance value from the lowermost layer of laminated anode electrode parts 4 to welding parts 6c of joint parts 6b at the tip width (w) 0.7 mm.

Moreover, the leakage current value shows one-minute values with the rated voltage 2.0 V application.

As is apparent from FIG. 4, since the solid electrolytic capacitor of the present embodiment shows low connection resistance values with the ratio (w/d) between the width (w) of the tip portion of each joint parts 6b and the diameter (d) of the welding trace in each welding parts 6b in a range of 0.50 to 1.50 as a low ESR mechanism in relation to the conduction of joint between anode electrode part 4 and anode com terminal 6, and since the connection resistance value deteriorates out of the range, it is found that low ESR is realized in this range.

Moreover, since the leakage current value by laser welding is improved with the above-mentioned ratio (w/d) in a range of 0.25 to 1.50, and in particular, the leakage current value is further made smaller with the ratio (w/d) in a range of 0.25 to 1.25, the effect of preventing damage of elements 1 seems to be obtained.

Exemplary Embodiment 2

Hereinafter, a solid electrolytic capacitor according to a second exemplary embodiment of the present invention will be described with reference to the drawings.

The present embodiment has the configuration in which the anode com terminal of the solid electrolytic capacitor described with reference to FIGS. 1A to 2 in the first embodiment is partially changed. Since the other configuration is the same as that of the first embodiment, the same reference numerals are given to the same portions so as not to repeat detailed description thereof, and only different portions will be described hereinafter with reference to the drawings. Moreover, also in the following exemplary embodiments, the same reference numerals are given for the same contents as in the already-made description, and the description is omitted.

Figure 5:
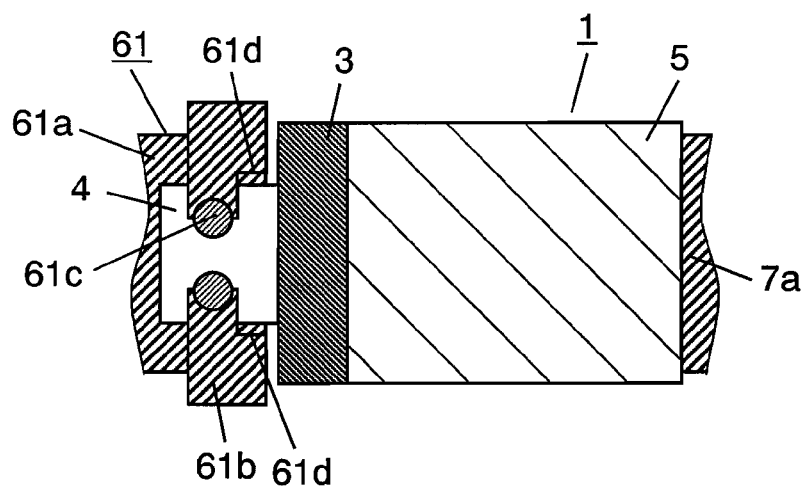
FIG. 5 is a plan view of a solid electrolytic capacitor according to a second embodiment of the present invention before external mounting.

FIG. 5 is a plan view of the solid electrolytic capacitor according to the second embodiment of the present invention before external mounting. In FIG. 5, anode com terminal 61 is provided with element mounting part 61a for mounting anode electrode parts 4 of elements 1. By bending upward both the ends of element mounting part 61a, a pair of joint parts 61b is formed. Moreover, joint parts 61b are formed such that the tip portion width is made small by providing a notch part 61d at each tip portion as a low ESR mechanism in relation to the conduction of joint between anode electrode part 4 and anode com terminal 61.

A plurality of anode electrode parts 4 of elements 1 is laminated and mounted on element mounting part 61a of anode com terminal 61 having such a configuration. Then, laminated anode electrode parts 4 are bound by wrapping anode electrode parts 4 from both the sides by bending joint parts 61b inward so as to be closely contacted with anode electrode parts 4. By directing laser beams using, e.g., YAG laser, to a notch part 61d at each tip portion formed narrowly of joint parts 61b and a flat portion of the upper surface of anode electrode parts 4 of elements 1, anode electrode parts 4 are joined by laser welding of welding parts 61c.

Like the solid electrolytic capacitor of the first embodiment, in the solid electrolytic capacitor of the present embodiment configured as above, only the tip portions of joint parts 61b of anode com terminal 61 to be joined with anode electrode parts 4 of elements 1 by laser welding are made narrow with a notch part 61d. Therefore, since the quantity of heat at the time of welding can hardly be diffused through joint parts 61b and is concentrated at welding parts 61b, a stable welded state can be obtained; therefore, the effect of achieving low ESR by suppressing deterioration of ESR can be provided.

Exemplary Embodiment 3

Hereinafter, a solid electrolytic capacitor according to a third exemplary embodiment of the present invention will be described with reference to the drawings.

Figure 6A:
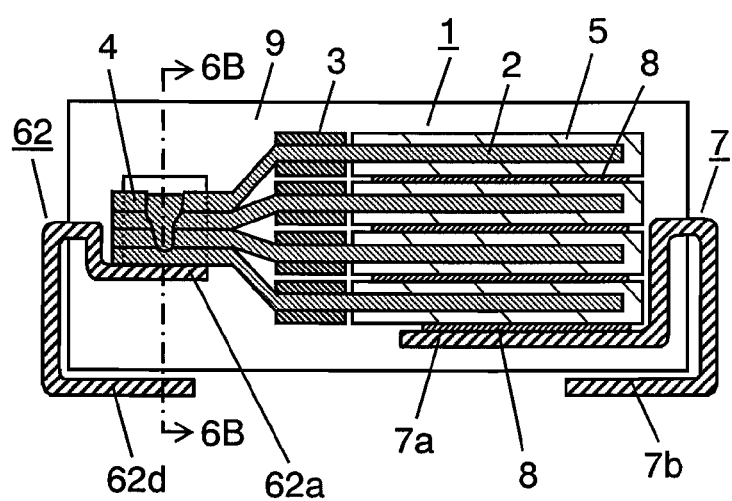
FIG. 6A is a front cross-sectional view showing the configuration of a solid electrolytic capacitor according to a third embodiment of the present invention.
Figure 6B:
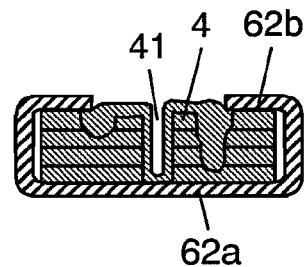
FIG. 6B is a side cross-sectional view taken along the line 6B-6B of FIG. 6A.
Figure 7:
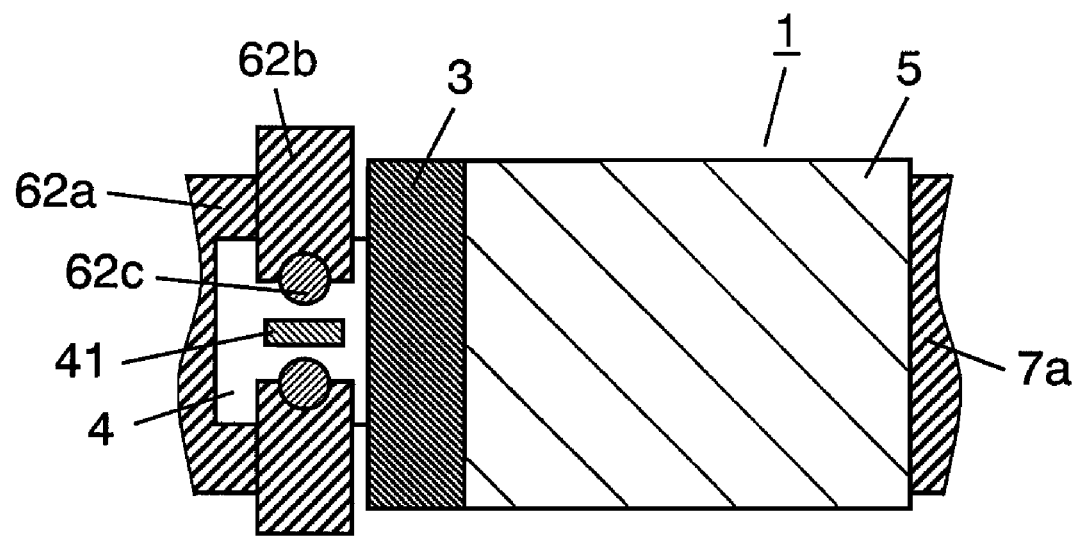
FIG. 7 is a plan view of the solid electrolytic capacitor before external mounting.
Figure 8:
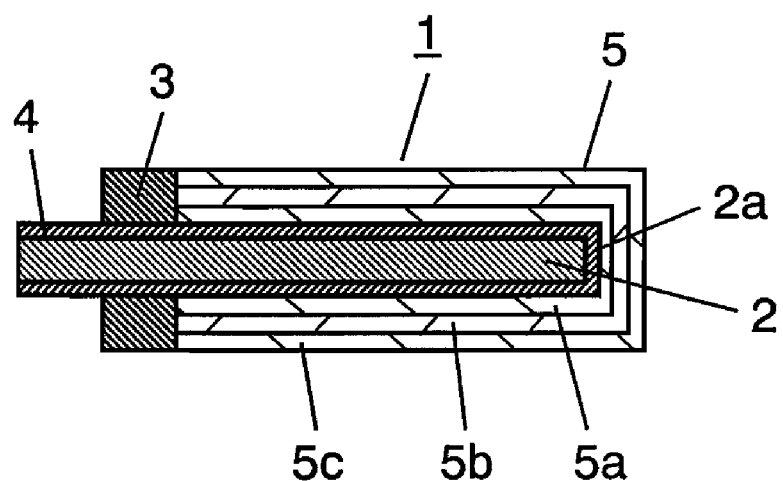
FIG. 8 is a cross-sectional view showing the configuration of an element to be used for the solid electrolytic capacitor.

FIG. 6A is a front cross-sectional view showing the configuration of the solid electrolytic capacitor according to the third embodiment of the present invention, FIG. 6B is a side cross-sectional view taken along the line 6B-6B thereof, FIG. 7 is a plan view of the solid electrolytic capacitor before external mounting, and FIG. 8 is a cross-sectional view showing the configuration of an element to be used for the solid electrolytic capacitor.

In FIGS. 6A to 8, flat plate-like element 1 is separated into anode electrode part 4 and cathode forming part (not shown) by providing insulating resist part 3 after forming dielectric oxide coating film layer 2a by roughing the surface of anode member 2 made of an aluminum film as a valve function metal. By successively laminating and forming cathode layers including solid electrolyte layer 5a made of a conductive polymer, carbon layer 5b, and silver paste layer 5c on dielectric oxide coating film layer 2a of the cathode forming part. In this manner, flat plate-like element 1 including anode electrode part 4 and cathode electrode part 5 provided with respect to resist part 3 in the longitudinal direction is provided.

As a low ESR mechanism in relation to the conduction of joint between anode electrode parts 4 and the anode com terminal 62, rectangular through hole 41 is provided at the substantial center in the width direction of anode electrode part 4 of element 1. Through hole 41 is provided with the longitudinal direction oriented in the direction orthogonal to the width direction of anode electrode part 4. Then, through hole 41 is provided to all elements 1 laminated in plurality (in the present embodiment, four pieces) such that through holes 41 are formed to communicate with one another in a state where elements 1 are laminated.

Moreover, through holes 41 may be formed through punching using a die or the like for each one element 1. Moreover, laminated elements 1 may be punched simultaneously. Moreover, the shape of through holes 41 may not be rectangular and may be square, round, elliptical, or the like.

Flat plate-like anode com terminal 62 including a lead frame of a metal such as copper and an iron alloy is connected with anode electrode parts 4 of elements 1. Anode com terminal 62 is provided with element mounting part 62a for mounting anode electrode parts 4 such that joint parts 62b are formed by bending upward both the ends of element mounting part 62a.

Then, the plurality of anode electrode parts 4 of elements 1 is laminated and mounted on element mounting part 62a of anode com terminal 62 having such a configuration. Then, anode electrode parts 4 are bound by being wrapped from both the sides by bending joint parts 62b inward so as to be closely contacted with anode electrode parts 4. By directing laser beams using, e.g., YAG laser, to the tip portions of joint parts 62b and anode electrode parts 4 in the vicinity of through holes 41 provided in elements 1, anode electrode parts 4 are joined by laser welding of welding parts 62c.

In this manner, an aluminum layer is formed on the inner surface of through holes 41 with the aluminum of anode electrode parts 4 with which welding parts 62c are melted further flowing on the aluminum surface of anode member 2 configuring anode electrode parts 4. With the aluminum layer, anode electrode parts 4 are joined in a communicating manner and connected electrically.

Flat plate-like cathode com terminal 7 including a lead frame of a metal such as copper and an iron alloy is connected with cathode electrode parts 5 of elements 1. Cathode com terminal 7 is provided with element mounting part 7a for mounting cathode electrode part 5 such that the joint between element mounting part 7a and cathode electrode parts 5, and between each cathode electrode part 5 of elements 1 is carried out using conductive adhesive 8.

Elements 1, anode com terminal 62, and cathode com terminal 7 are covered integrally with insulating exterior resin 9 with anode com terminal 62 and cathode com terminal 7 partially exposed to the outer surface. By bending portions of anode com terminal 62 and cathode com terminal 7 exposed from exterior resin 9 from the side surfaces toward the bottom surface along exterior resin 9, a surface mounting type solid electrolytic capacitor with anode terminal part 62d and cathode terminal part 7b formed in the bottom surface part is provided.

Hereinafter, specific experiment examples will be described; however, the present invention is not limited thereto.

Experiment Example 1

First, with the thickness of aluminum foil to be anode member 2 of 0.1 mm, four pieces of elements 1 using the aluminum foil for anode member 2 were laminated for producing a solid electrolytic capacitor of a rated voltage of 2.0 V and a capacitance of 220 μF using anode com terminal 62 including a copper alloy lead frame having 0.1 mm thickness and cathode com terminal 7.

The width B of each tip portion of joint parts 62b provided in anode com terminal 62 is 0.7 mm, and the distance C between the tip portions of joint parts 62b is 0.9 mm. Rectangular through holes 41 each having a longer side of 0.5 mm and a shorter side of 0.2 mm was provided in anode electrode parts 4 at a substantially central position between the tip portions of the pair of joint parts 62b. Through holes 41 have the longitudinal direction provided in the direction orthogonal to the width direction of anode electrode parts 4.

Laser welding was carried out using YAG laser at the laser output of 2 kW to weld the tip portions of joint parts 62b and the uppermost surface of laminated anode electrode parts 4. The diameter of the welding trace in laser welding parts 62c at the time was 0.4 mm.

Experiment Example 2

In the experiment example 2, through holes 41 provided in anode electrode parts 4 of elements 1 in the experiment example 1 are changed in shape. As shown in detail in FIG. 9, rectangular through holes 42 of elements 1 are arranged with the longitudinal direction oriented in the width direction of anode electrode parts 4, and except for this, a solid electrolytic capacitor was produced in the same manner as in the experiment example 1.

Comparative Experiment Example

In the same manner as in the above-mentioned experiment examples 1 and 2 except that through holes are not provided, a solid electrolytic capacitor of a rated voltage of 2.0 V and a capacitance of 220 µF was produced as a comparative experiment example.

Figures 9, 10:
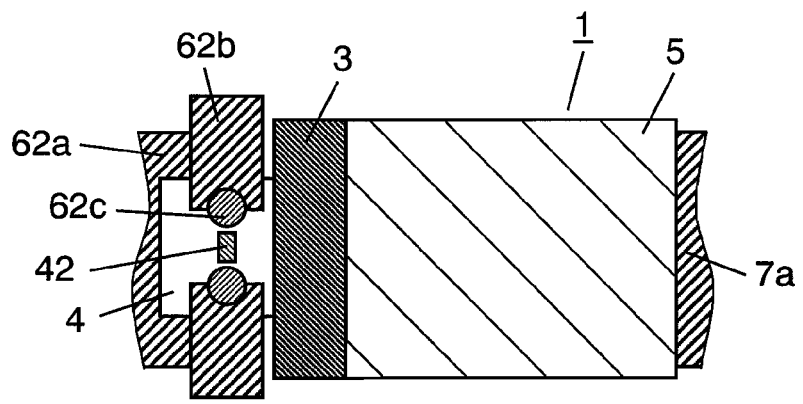
FIG. 9 is a plan view of a solid electrolytic capacitor according to the experiment example 2 before external mounting.
FIG. 10 is a table showing the ESR characteristic comparison among solid electrolytic capacitors.

FIG. 10 shows the results of confirmation of ESR characteristics (measurement frequency 100 kHz) of the solid electrolytic capacitors of the experiments 1, 2, and the comparative experiment example produced as above.

As is apparent from FIG. 10, the solid electrolytic capacitors of the present invention are provided with through holes 41 (42) between welding parts 62c of anode electrode parts 4 of elements 1. Therefore, since molten aluminum flows from anode electrode parts 4 into through holes 41 (42) at the time of welding, the entirety of anode electrode parts 4 laminated in plurality can be joined evenly. As a result, it is found that the ESR can be reduced dramatically. Moreover, it is found that the variation in the ESR is reduced as well.

Moreover, as to the size of each through hole 41 (42), 0.1 mm to 0.7 mm is suitable. If it is smaller than 0.1 mm, the molten aluminum can hardly flow in, and if it is larger than 0.7 mm, the mechanical strength of anode electrode parts 4 is weak, and thus it is not preferable. Therefore, a rectangular shape is suitable.

Moreover, according to the configuration in which rectangular through holes 42 are provided such that the longitudinal direction is oriented in the width direction of anode electrode parts 4 as in the above-mentioned experiment example 2, since the distance between each welding part 62c and through holes 42 can be shortened, the molten aluminum can enter from anode member 2 into through holes 42 easily at the time of welding.

Moreover, as to the distance between each welding part 62c and through holes 41 (42), 0.1 mm to 0.5 mm is suitable. If it is smaller than 0.1 mm, the irregularity of the molten state of welding parts 62c becomes greater, and if it is larger than 0.5 mm, the aluminum amount to flow into through holes 41 (42) is insufficient, and thus it is not preferable.

As described above, the solid electrolytic capacitor according to the present invention has a configuration in which through holes 41 (42) are provided in anode electrode parts 4 in the vicinity of welding parts 62c for joining anode electrode parts 4 of elements 1 with anode com terminal 62. In this manner, since a portion of anode electrode parts 4 melted at the time of welding flows into through holes 41 (42) to electrically connect anode electrode parts 4 of the element with one another, the effect of joining the entirety of laminated elements 1 so as to reduce the ESR can be achieved.

Moreover, since welding parts 62c are separated from through holes 41 (42) and provided in the vicinity thereof, the molten state of welding parts 62c is provided stably, so that the connection resistance among anode electrode parts 4 can be made smaller.

Moreover, by directing laser beams to a flat portion of anode electrode parts 4, the molten state of welding parts 62c can be provided further stably, so that the flow amount of a portion of molten anode electrode parts 4 into through holes 41 (42) can be provided stably, and thus variation in connection resistance among anode electrode parts 4 can be reduced.

Moreover, since through holes 41 (42) are provided on a line linking two welding parts 62c, the amount of a portion of molten anode electrode parts 4 flowing into through holes 41 (42) can be increased, so that the connection resistance among anode electrode parts 4 can be reduced.

Moreover, since welding parts 62b are provided, through holes 41 (42) of laminated anode electrode parts 4 can be contacted tightly, even in the case the amount of a portion of molten and flowing anode electrode parts 4 is little, the connection resistance among anode electrode parts 4 can be reduced.

Exemplary Embodiment 4

Hereinafter, a solid electrolytic capacitor according to an exemplary fourth embodiment of the present invention will be described with reference to the drawings.

In the present embodiment, the shape of the through holes provided in the anode electrode parts of the elements to be used for the solid electrolytic capacitor described with reference to FIGS. 6, 7, and 8 in the third embodiment is changed partly. Since the other configuration is the same as that of the third embodiment, the same reference numerals are given to the same portions so as not to repeat detailed description thereof, and only different portions will be described hereinafter with reference to the drawings.

Figure 11:
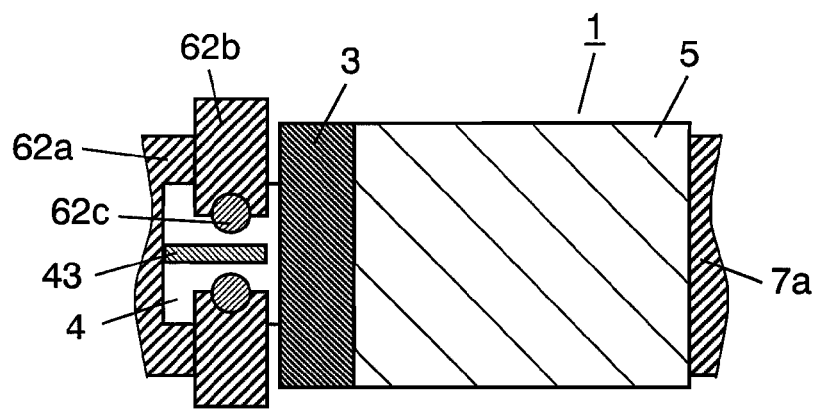
FIG. 11 is a plan view of a solid electrolytic capacitor according to a fourth embodiment of the present invention before external mounting.

FIG. 11 is a plan view of the solid electrolytic capacitor according to the fourth embodiment of the present invention before external mounting. In FIG. 11, rectangular through holes 43 are provided as a low ESR mechanism in relation to the conduction of joint between anode electrode parts 4 and anode com terminal 62 at the substantial center in the width direction of anode electrode parts 4 of elements 1. Through holes 43 are provided with the longitudinal direction oriented in the direction orthogonal to the width direction of anode electrode parts 4 in a slit-like shape so as to divide anode electrode parts 4 at one end.

In the solid electrolytic capacitor of the present embodiment configured as above, through holes 43 are enlarged and formed into a slit-like shape so as to divide anode electrode parts 4 by a portion thereof. Therefore, the molten aluminum from the anode member at the time of welding can enter through holes 43 more easily, so that the effect obtained by the solid electrolytic capacitor by the third embodiment is provided further efficiently.

Exemplary Embodiment 5

Hereinafter, a solid electrolytic capacitor according to a fifth exemplary embodiment of the present invention will be described with reference to the drawings.

Figure 12A:
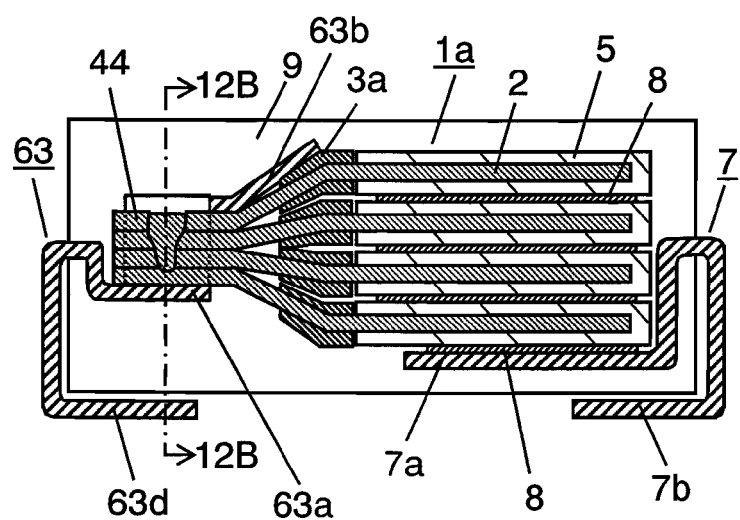
FIG. 12A is a front view showing the configuration of a solid electrolytic capacitor according to a fifth embodiment of the present invention.
Figure 12B:
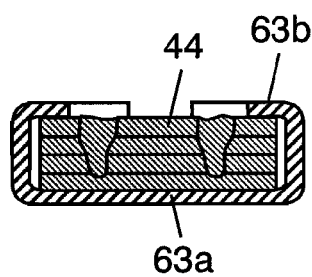
FIG. 12B is a side cross-sectional view taken along the line 12B-12B of FIG. 12A.
Figure 13:
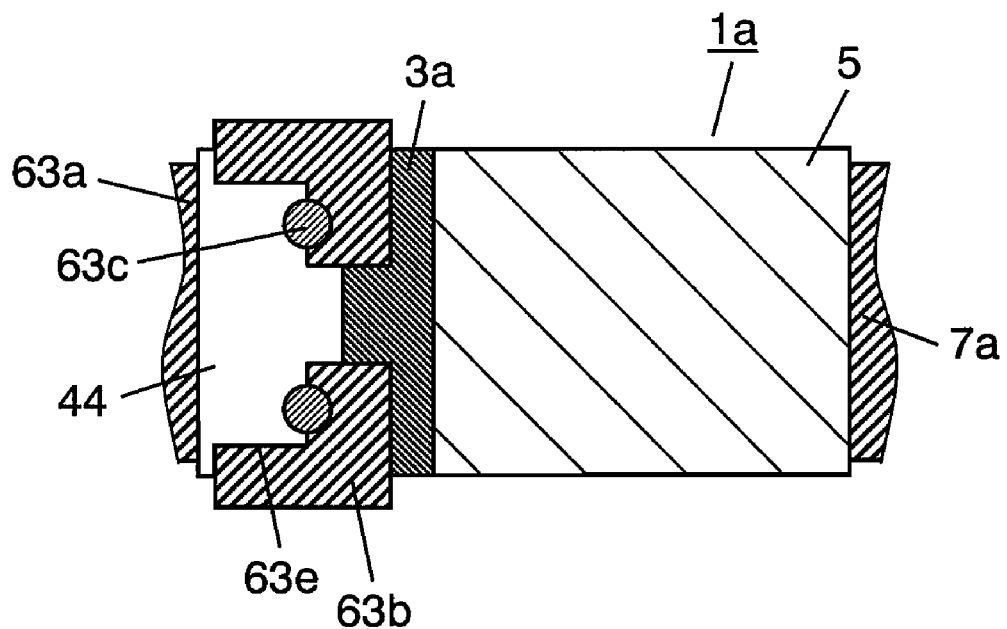
FIG. 13 is a plan view of the solid electrolytic capacitor before external mounting.
Figure 14:
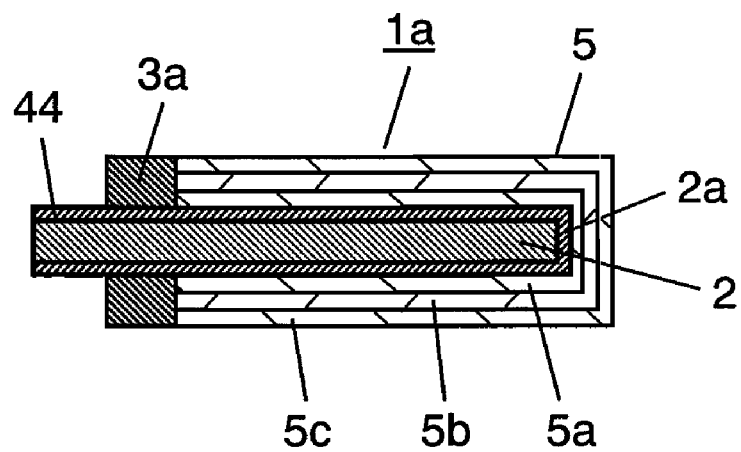
FIG. 14 is a front cross-sectional view showing the configuration of an element to be used for the solid electrolytic capacitor.

FIGS. 12A and 12B are a front cross-sectional view showing the configuration of the solid electrolytic capacitor according to the fifth embodiment of the present invention and a side cross-sectional view taken along the line 12B-12B thereof, FIG. 13 is a plan view of the solid electrolytic capacitor before external mounting, and FIG. 14 is a cross-sectional view showing the configuration of an element to be used for the solid electrolytic capacitor.

In FIGS. 12A to 14, element 1a has dielectric oxide coating film layer 2a formed by roughing the surface of anode member 2 made of an aluminum foil serving as a valve function metal. Thereafter, by providing insulating resin part 3a made of an insulating resin such as a polyimide resin and a silicone resin, it is separated into anode electrode part 44 and a cathode forming part (not shown). Then, cathode electrode part 5 is formed by successively laminating and forming cathode layers including solid electrolyte layer 5a made of a conductive polymer, carbon layer 5b, and silver paste layer 5c on dielectric oxide coating film layer 2a of the cathode forming part. In this manner, there is provided flat plate-like element 1a with anode electrode part 44 and cathode electrode part 5 provided on both sides in the longitudinal direction with respect to insulating resin layer 3.

Flat plate-like anode com terminal 63 including a lead frame of a metal such as copper and a copper alloy is connected with anode electrode parts 44 of elements 1*a*. Anode com terminal 63 is provided with element mounting part 63*a* for mounting anode electrode parts 44 such that a pair of joint parts 63*b* is formed by bending both the ends of element mounting part 63*a* upward. Joint parts 63*b* are formed in a size capable of covering simultaneously a portion of insulating resin part 3*a* provided as a low ESR mechanism in relation to the conduction of joint between anode electrode parts 44 and anode com terminal 63 for insulation between anode electrode parts 44 and cathode electrode parts 5 of elements 1*a*. Furthermore, notch parts 63*e* are provided on anode electrode part 44 side at the tip portions.

Then, anode electrode parts 44 of elements 1*a* are laminated and mounted on element mounting part 63*a* of anode com terminal 63 having such a configuration. Then, anode electrode parts 44 are bound by bending joint parts 63*b* inward for wrapping anode electrode parts 44 from both the sides so as to be closely contacted with anode electrode parts 44. By covering portions of insulating resin parts 3*a* of elements 1*a* together therewith and laser-welding welding parts 63*c* by directing laser beams such as, e.g., YAG laser, simultaneously to notch parts 63*e* provided at the tip portions of joint parts 63*b* and anode electrode parts 44 of elements 1*a*, anode electrode parts 44 are joined.

Flat plate-like cathode com terminal 7 including a lead frame of a metal such as copper and a copper alloy is connected with cathode electrode parts 5 of elements 1*a*. Cathode com terminal 7 is provided with element mounting part 7*a* for mounting cathode electrode parts 5 such that the joint between element mounting part 7*a* and cathode electrode parts 5, and between each cathode electrode part 5 of elements 1*a* is made using conductive adhesive 8.

Elements 1*a*, anode com terminal 63, and cathode com terminal 7 are covered integrally with insulating exterior resin 9 with both anode com terminal 63 and cathode com terminal 7 exposed partially to the outer surface. By bending portions of anode com terminal 63 and cathode com terminal 7 exposed from exterior resin 9 from the side surfaces toward the bottom surface along exterior resin 9, there is provided a surface mounting type solid electrolytic capacitor with anode terminal part 63*d* and cathode terminal part 7*b* formed in the bottom surface part.

In the solid electrolytic capacitor of the fifth embodiment configured as above, a portion of insulating resin parts 3*a* provided for the insulation between anode electrode parts 44 and cathode electrode parts 5 are covered with joint parts 63*b* of anode com terminal 63 to be joined with anode electrode parts 44 of elements 1*a*. In this manner, even if sputter generated at the time of welding is scattered, since insulating resin parts 3*a* are covered with a portion of joint parts 63*b*, it is not influenced, and thus highly reliable welding can be carried out stably. Thus, the effect of achieving high reliability and low ESR can be provided.

In the present embodiment, a configuration of providing notch parts 63*e* at the tip portions of joint parts 63*b* of anode com terminal 63 to be joined with anode electrode parts 44 of elements 1*a* and welding at welding parts 63*c* in the notch parts has been described as an example. However, the present invention is not limited thereto, and the same effect can be obtained with a configuration where joint parts 63*b* are present between welding parts 63*c* and insulating resin parts 3*a* and portions of joint parts 63*b* cover portions of insulating resin parts 3*a*. Moreover, the shape of the tip portions of joint parts 63*b* may be a shape other than the notch part.

Exemplary Embodiment 6

Hereinafter, a solid electrolytic capacitor according to a sixth exemplary embodiment of the present invention will be described with reference to the drawings.

Figure 15:
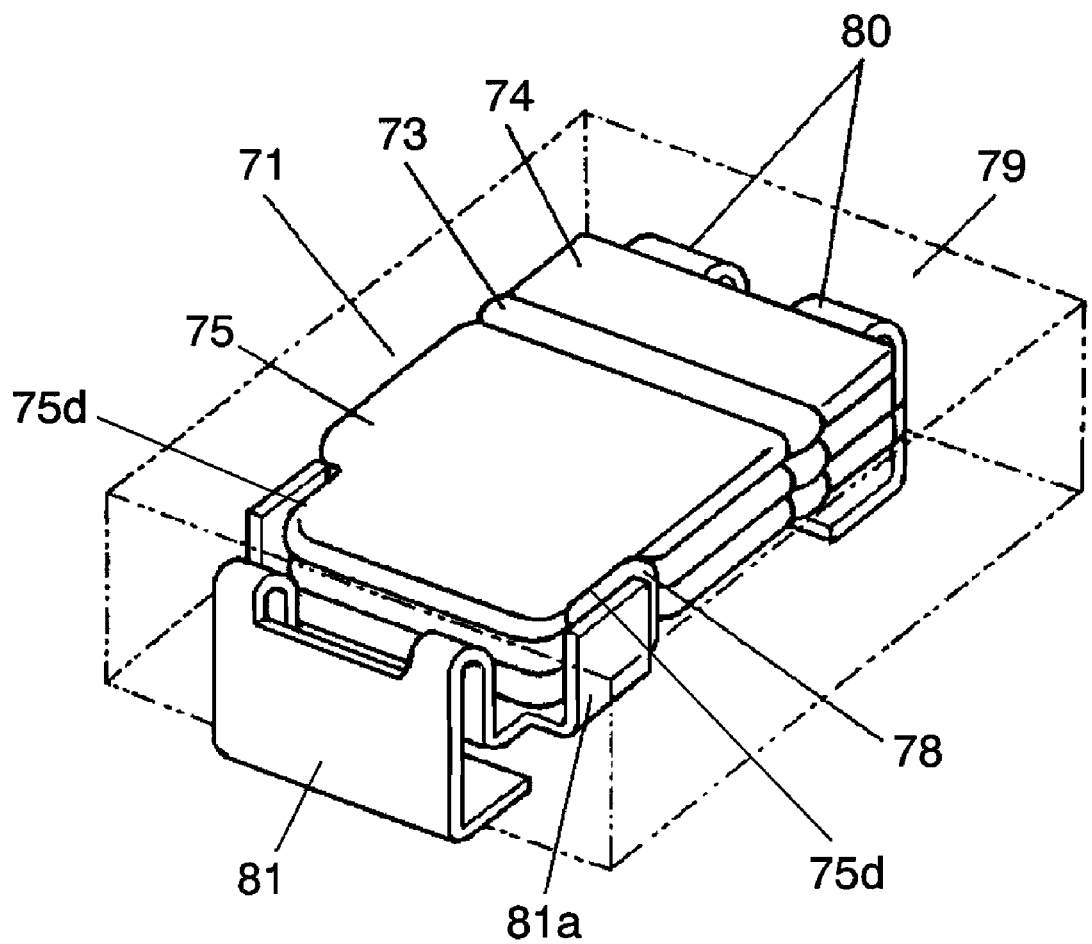
FIG. 15 is a perspective view showing the configuration of a solid electrolytic capacitor of a sixth embodiment of the present invention.
Figure 16A:
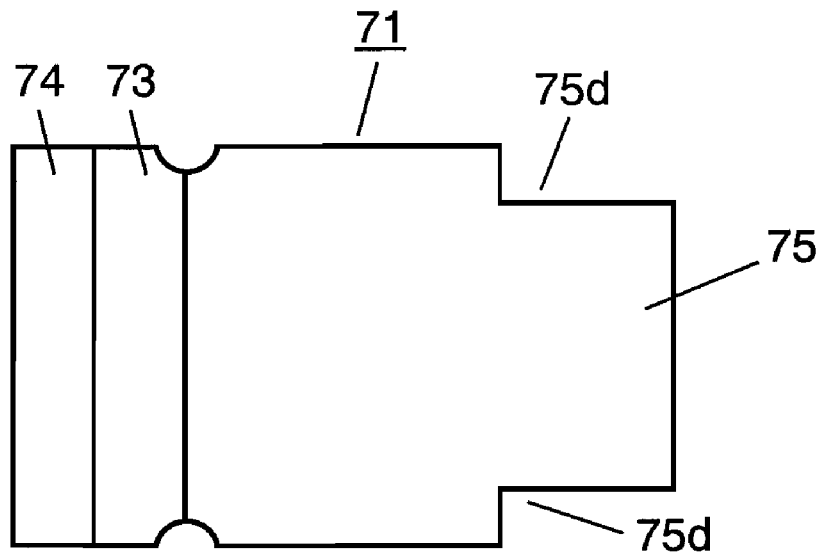
FIG. 16A is a plan view showing the configuration of an element to be used for the solid electrolytic capacitor.
Figure 16B:
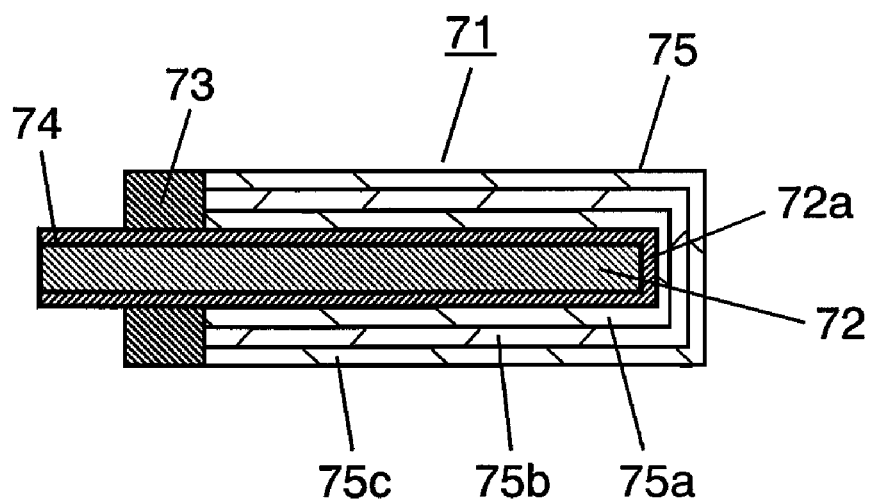
FIG. 16B is a cross-sectional view thereof.

FIG. 15 is a perspective view showing the configuration of the solid electrolytic capacitor of the sixth embodiment of the present invention, FIGS. 16A and 16B are a plan view and a cross-sectional view showing the configuration of an element to be used for the solid electrolytic capacitor.

In FIGS. 15 to 16B, element 71 is separated into anode electrode part 74 and a cathode forming part (not shown) by providing insulating resist part 73 after forming dielectric oxide coating film layer 72*a* by roughing the surface of anode member 72 made of an aluminum foil serving as a valve function metal. By successively laminating and forming cathode layers including solid electrolyte layer 75*a* made of a conductive polymer, carbon layer 75*b*, and silver paste layer 75*c* on dielectric oxide coating film layer 72*a* of the cathode forming part, cathode electrode part 75 is formed. In this manner, there is provided flat plate-like element 71 including anode electrode part 74 and cathode electrode part 75 provided with respect to resist part 73 in the longitudinal direction.

Moreover, a pair of rectangular notch parts 75*d* is provided as a low ESR mechanism relating to the conduction of joint between cathode electrode part 75 and cathode com terminal 81 at both ends of the end portion of cathode electrode part 75 in the direction linking anode electrode part 74 and cathode electrode part 75 in cathode electrode part 75 of element 71.

Flat plate-like anode com terminal 80 including a lead frame of copper, a copper alloy, or the like, is connected with anode electrode parts 74 of elements 71 with anode electrode parts 74 of elements 71 laminated and mounted on anode com terminal 80 joined by means of laser welding or the like.

Flat plate-like cathode com terminal 81 including a lead frame of copper, a copper alloy, or the like, is connected with cathode electrode parts 75 of elements 71, wherein side wall parts 81*a* are formed by bending upward both the side surfaces of the element mounting portion of cathode com terminal 81. Joint between the element mounting portion of cathode com terminal 81 and cathode electrode parts 75, and between each cathode electrode part 75 of elements 71 is made with a conductive adhesive (not shown). Furthermore, since side wall parts 81*a* are fitted and contacted with notch parts 75*d* provided in cathode electrode parts 75 of elements 71, the electrical connection resistance between elements 71 and cathode com terminal 81 is made smaller.

Moreover, as shown in FIG. 15, the inner surfaces of side wall parts 81*a* and the side surfaces of notch parts 75*d* may be connected electrically by applying conductive adhesive 78. In this manner, the ESR of the solid electrolytic capacitor can be made smaller by further making smaller the electrical connection resistance between elements 71 and cathode com terminal 81.

Moreover, notch parts 75*d* and side wall parts 81*a* may be joined by providing conductive adhesive 78 on both the surfaces of the side surfaces parallel to the direction of linking anode electrode parts 74 and cathode electrode parts 75 and the side surfaces in the direction orthogonal to that direction in notch parts 75*d*. Thus, the connection strength between elements 71 and cathode com terminal 81 is improved, and furthermore, the electrical connection resistance can be provided stably.

Moreover, conductive adhesive 78 may be used only for the connection between side wall parts 81*a* and cathode electrode parts 75. Moreover, it may be used in combination with either the connection between the element mounting part and cathode electrode parts 75 or the connection among cathode electrode parts 75 with one another. These techniques are all contributing as a low ESR mechanism.

Elements 71 are covered integrally with insulating exterior resin 79 with both anode com terminal 80 and cathode com terminal 81 exposed to the outer surface partially, and portions of anode com terminal 80 and cathode com terminal 81 exposed from exterior resin 79 are bent toward the bottom surface along exterior resin 79. In this manner, there is provided a surface mounting type solid electrolytic capacitor with the anode terminal part and the cathode terminal part formed in the bottom surface part.

Figures 17, 18:
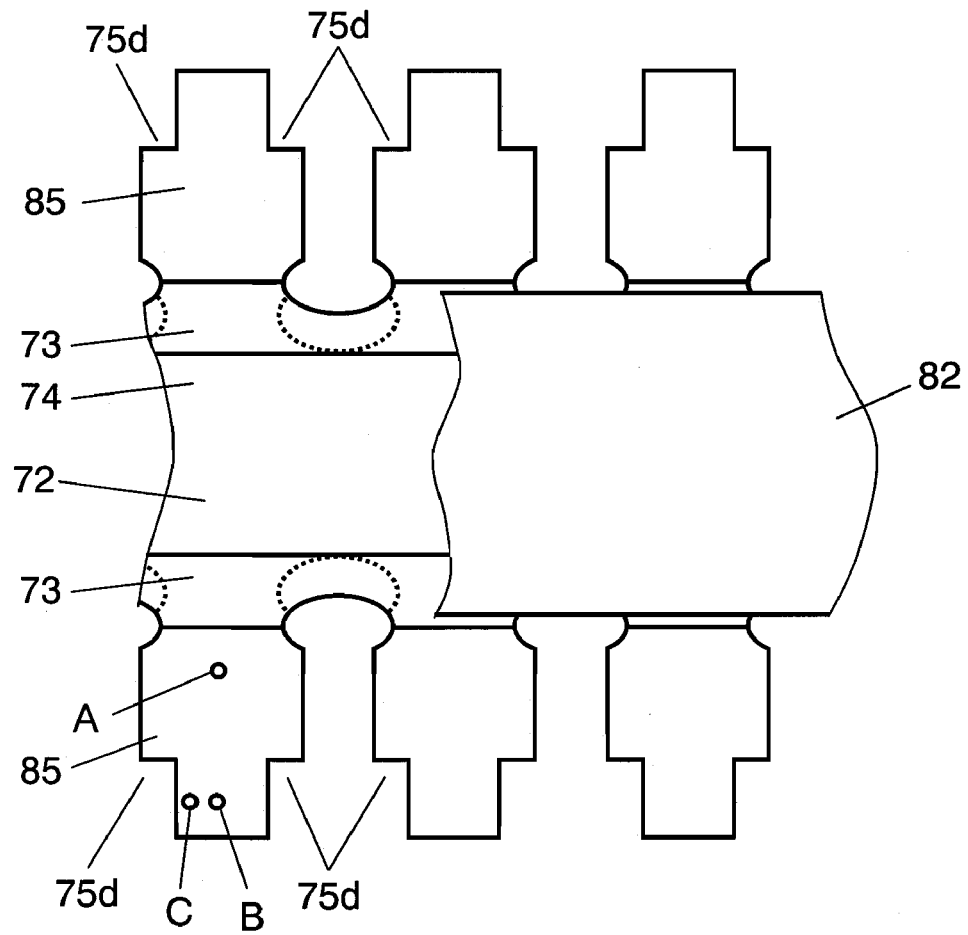
FIG. 17 is a plan view showing a main part of the process of forming a solid electrolyte layer of the element by electropolymerization.
FIG. 18 is table for characteristic comparison with respect to a conventional product.

Moreover, FIG. 17 is a plan view showing a main part of the process of forming the solid electrolyte layer of element 71 by electropolymerization. In FIG. 17, anode member 72 is provided by blanking into a predetermined shape of an aluminum foil having dielectric oxide coating film layer 72*a* (not shown) formed by surface roughing. Insulating resist part 73 for separating anode member 72 into anode electrode part 74 and cathode forming part 85 is formed with a pair of notch parts 75*d* provided on both ends of the end portion of cathode forming part 85, and power supply tape 82 is attached to form electrode for supplying power to anode member 72. By soaking the same into a polymerization vessel (not shown) filled with a polymerization solution and supplying power via power supply tape 82, electropolymerization is carried out. Solid electrolyte layer 75*a* (not shown) made of a conductive polymer is formed on the surface of cathode forming part 85 having a thin film base layer such as a manganese dioxide layer formed by thermal decomposition on dielectric oxide coating film layer 72*a*.

The production of solid electrolyte layer 75*a* with respect to cathode forming part 85 configured as above proceeds along the current flow supplied to cathode forming part 85 via power supply tape 82, so that solid electrolyte layer 75*a* is formed in the order of points A, B, and C shown in the figure. However, since a pair of notch parts 75*d* is provided on both ends of the end portion of cathode forming part 85, which is a portion in which the procedure proceed most slowly, the portion in which the procedure proceeds substantially the most slowly is the portion of point C. Therefore, compared with the case without notch parts 75*d*, time needed for attaining a desired film thickness of solid electrolyte layer 75*a* is shortened.

Figure 25:
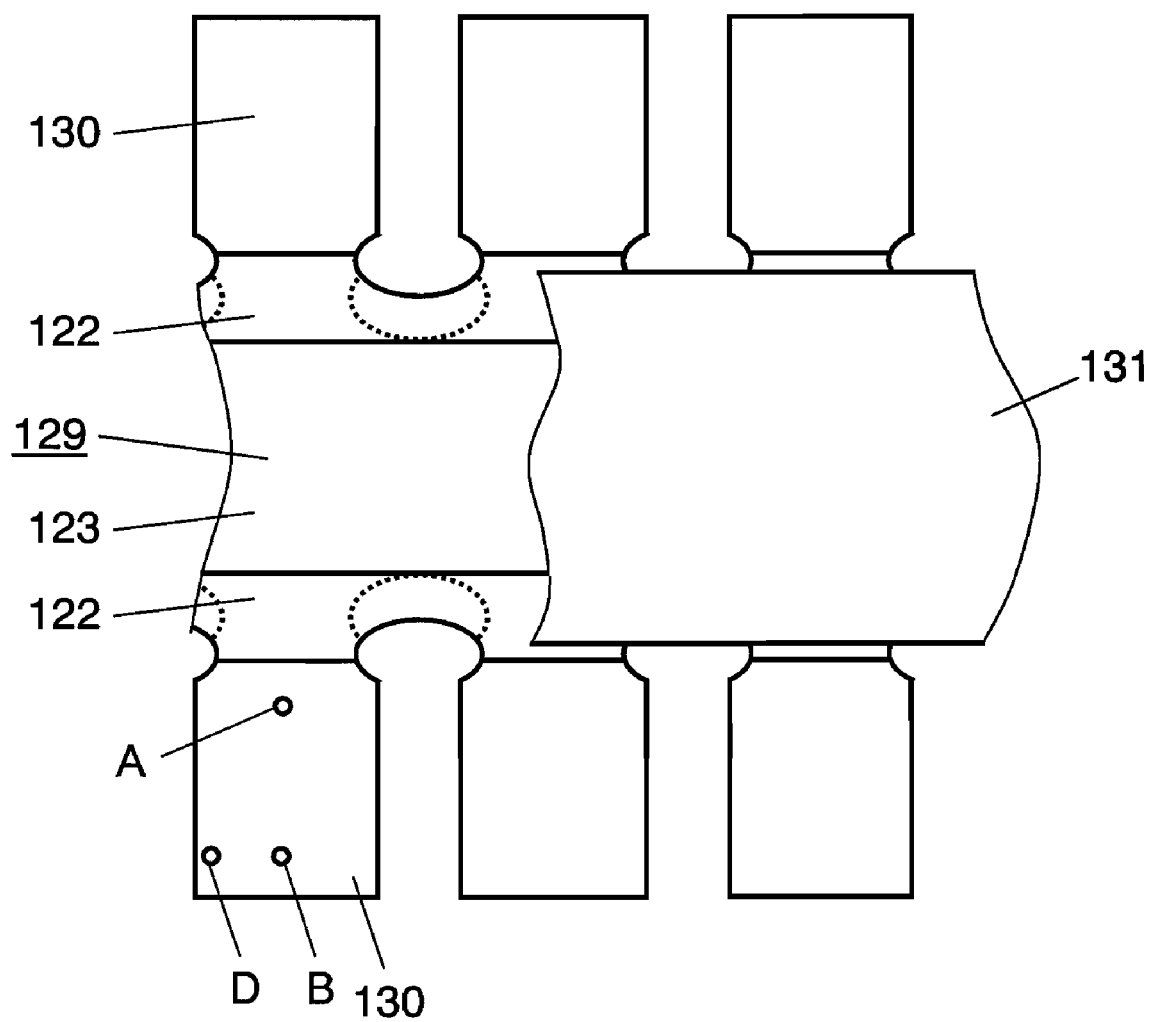
FIG. 25 is a plan view showing a main part of the process of forming a solid electrolyte layer of the element of the conventional solid electrolytic capacitor of FIG. 23 by electropolymerization.

Therefore, at the point where solid electrolyte layer 75*a* in point C portion attains the desired film thickness, the film thicknesses of point B and A portions are not so thick. Therefore, compared with conventional products, ESR reduction can be achieved by preventing increase of unnecessary resistance by reducing the portion having a film thickness more than necessary. These results are shown in FIG. 18 in comparison with the conventional product described with reference to FIG. 25 in the Background of the Invention.

The solid electrolytic capacitors of the present invention and the conventional product shown in FIG. 18 each including one element 71 have a rated voltage of 2.0 V, and a capacitance of 47 µF. The thickness index of solid electrolyte layer 75*a* at each point A, B, C, and D of anode member 72 is the thickness at each point with the point D thickness set as 100%.

As it is apparent from FIG. 18, the solid electrolytic capacitor of the present embodiment has the film thickness at point A as the thickest portion is 110% of point C at the point where point C as the thinnest film thickness portion of solid electrolyte layer 75*a* attains the desired film thickness. On the other hand, according to the conventional product, the film thickness at point A as the thickest portion is 125% of point D at the point where point D as the thinnest portion attains the desired film thickness. It is found from this that ESR reduction can be achieved by preventing increase of unnecessary resistance by reducing the portion formed to a film thickness that is more than necessary according to the present invention. Moreover, the ESR (measurement frequency 100 kHz) of the solid electrolytic capacitor of the present invention is 10 mΩ, while the ESR of the solid electrolytic capacitor of the conventional product is 15 mΩ.

According to the solid electrolytic capacitor of the present invention, the portion formed to a film thickness that is more than necessary at the point where solid electrolyte layer 75*a* in the thinnest portion attains a desired film thickness can be reduced at the time of forming solid electrolyte layer 75*a* made of a conductive polymer by electropolymerization in cathode forming part 75 of anode member 72. Therefore, there can be provided an effect of reducing ESR by preventing increase of unnecessary resistance by suppressing variation in film thickness of solid electrolyte layer 75*a* in cathode forming part 75 can be provided.

Exemplary Embodiment 7

Hereinafter, a solid electrolytic capacitor according to a seventh exemplary embodiment of the present invention will be described with reference to the drawings.

The present embodiment has a configuration in which the element to be used for the solid electrolytic capacitor described with reference to FIGS. 15 to 18 in the sixth embodiment is partially changed. Since the other configuration is the same as that of the sixth embodiment, the same reference numerals are given to the same portions so as not to repeat detailed description thereof, and only different portions will be described hereinafter with reference to the drawings.

Figure 19:
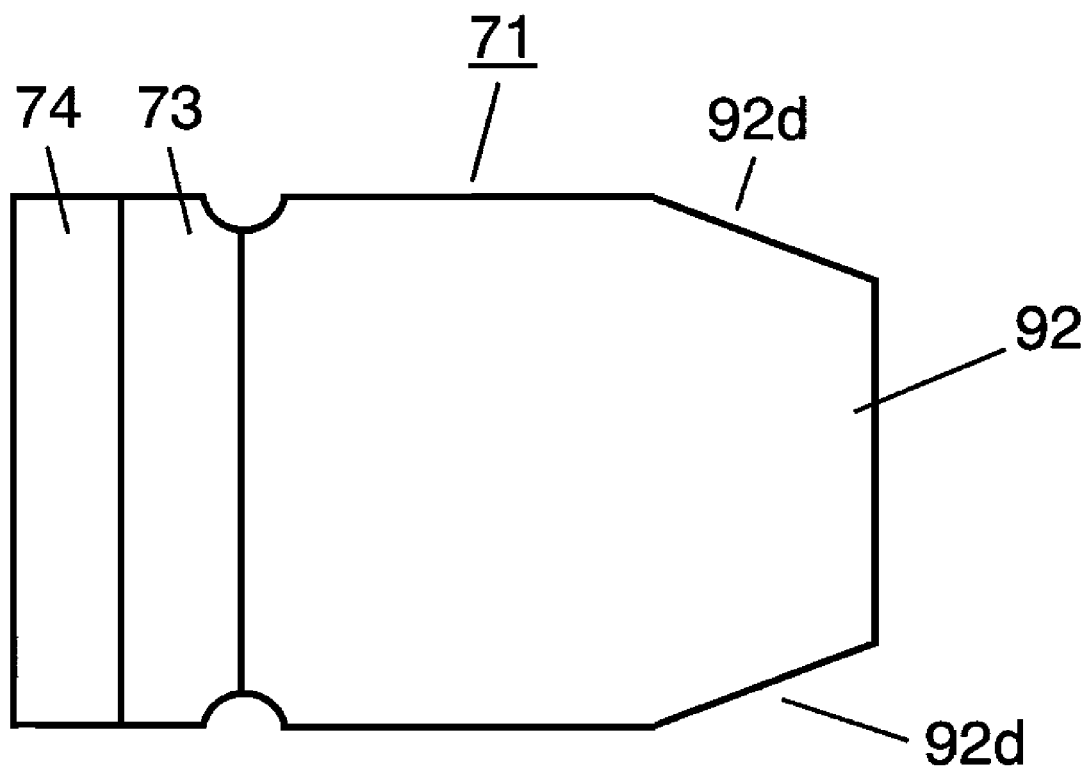
FIG. 19 is a plan view showing the configuration of an element to be used for a solid electrolytic capacitor according to a seventh embodiment of the present invention.
Figure 20A:
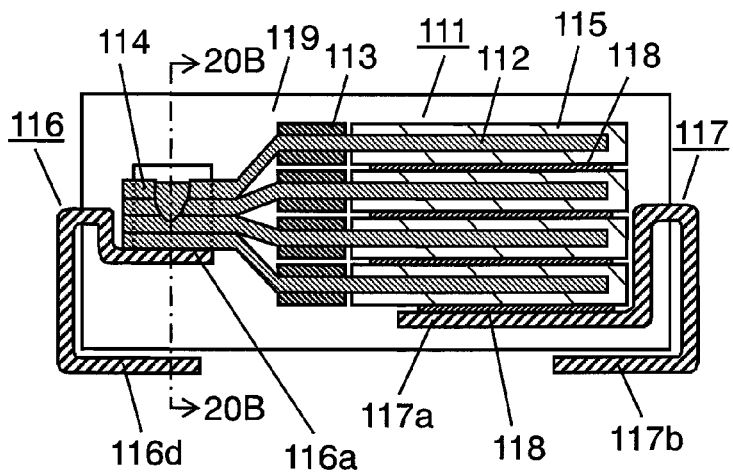
FIG. 20A is a front cross-sectional view showing the configuration of a conventional solid electrolytic capacitor.
Figure 20B:
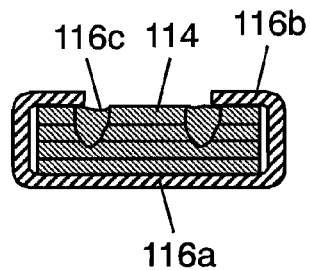
FIG. 20B is a side cross-sectional view taken along the line 20B-20B of FIG. 20A.
Figure 21:
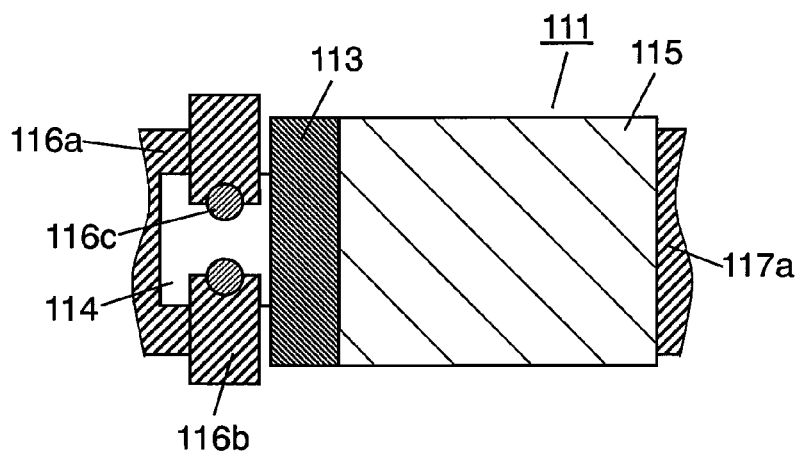
FIG. 21 is a plan view of the conventional solid electrolytic capacitor of FIG. 20A before external mounting.
Figure 22:
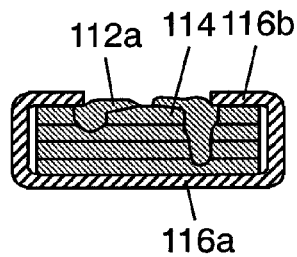
FIG. 22 is a side cross-sectional view taken along the line 20B-20B of FIG. 20A.
Figure 23:
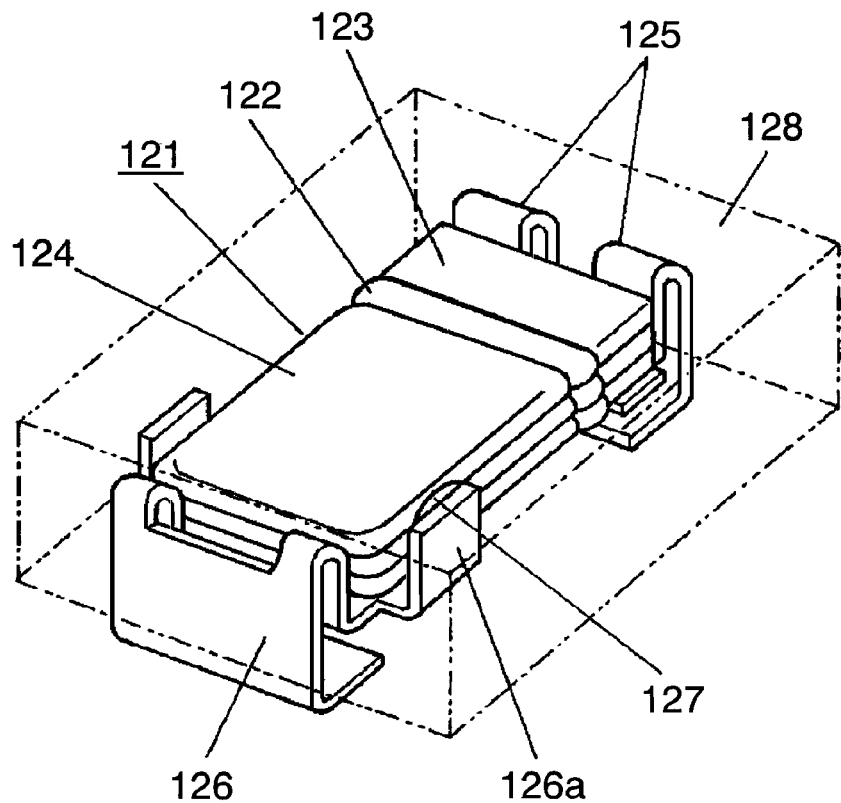
FIG. 23 is a perspective view showing the configuration of a conventional solid electrolytic capacitor.
Figure 24:
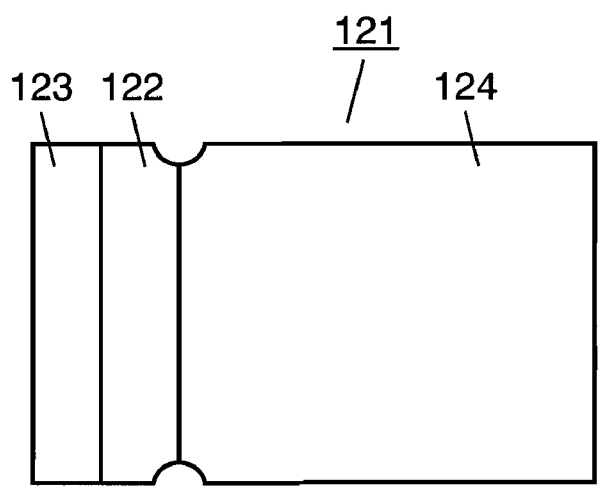
FIG. 24 is a plan view showing the configuration of an element to be used for the conventional solid electrolytic capacitor of FIG. 23.

FIG. 19 is a plan view showing the configuration of an element to be used for the solid electrolytic capacitor according to the seventh embodiment of the present invention. In FIG. 19, element 91 includes insulating resist part 73, anode electrode part 74, and cathode electrode part 92, such that both ends of the end portion of cathode electrode part 92 are each cut linearly obliquely so as to provide a pair of tapered parts 92*d* as a low ESR mechanism in relation to the conduction of joint between cathode electrode part 92 and cathode com terminal 81 (not shown).

In the case of using element 91 having such a configuration, although not shown in the figure, the side wall parts to be formed by bending upward both the side surfaces of the element mounting portion of cathode com terminal 81 should be formed so as to be contacted with a pair of tapered parts 92*d* provided on both ends of the end portion of cathode electrode part 92.

Furthermore, by applying conductive adhesive 78 (not shown) between side wall parts and tapered parts 92*d* of cathode electrode part 92 for the electrical conduction as a low ESR mechanism, the ESR can be further reduced.

Like element 71 of the sixth embodiment, element 91 of the present embodiment having such a configuration has a pair of tapered parts 92*d* provided on both ends of the end portion of cathode electrode part 92 as the portion to have the latest procedure at the time of forming the solid electrolyte layer made of a conductive polymer by electropolymerization. Thus, the time for attaining a desired film thickness of the solid electrolyte layer is shortened, so that the portion to be formed to a film thickness that is more than necessary can be reduced compared with the conventional product, and thus the increase of unnecessary resistance can be prevented and the effect of reducing the ESR can be achieved.

As heretofore described, the present invention solves the conventional various problems, and as to the anode electrode, a stable welded state can easily be obtained, and the insulation between the anode electrode part and the cathode electrode part can be maintained preferably by preventing the influence of sputter at the time of welding. Moreover, as to the cathode electrode part, the film thickness variation of the solid electrolyte layer in the cathode forming part can be suppressed, thereby realizing low ESR by suppressing deterioration of ESR. These measures may be carried out in the periphery of the anode electrode or the cathode electrode, however, the effect can be further enhanced by using them in combination.

Accordingly, the solid electrolytic capacitor of the present invention is useful particularly in the field in which good impedance characteristics in the high frequency range is required, or the like.

What is claimed is:

1. A solid electrolytic capacitor comprising:
   a flat plate-like element using a conductive polymer as solid electrolyte, the element having an anode electrode part and a cathode electrode part with an insulating part interposed therebetween;
   an anode terminal that is joined with the anode electrode part of the flat plate-like element;
   a cathode terminal that is joined with the cathode electrode part of the flat plate-like element;
   an exterior resin covering integrally the flat plate-like element, the anode terminal, and the cathode terminal with the anode terminal and the cathode terminal exposed partially; and
   a low ESR mechanism relating to conduction of at least either one of a joint between the anode electrode part and the anode terminal and a joint between the cathode electrode part and the cathode terminal.

2. The solid electrolytic capacitor according to claim 1, wherein the low ESR mechanism has a configuration in which a joint part is provided in the anode terminal to be joined with the anode electrode part such that a tip of the joint part is joined with a flat portion of the anode electrode part by laser welding, and a ratio (w/d) of a width (w) of the tip of the joint part and a diameter (d) of a welding trace in the laser welding part is 0.5 to 1.5.

3. The solid electrolytic capacitor according to claim 2, wherein the width of the tip portion of the joint part provided in the anode terminal is narrower than other portions of the joint part.

4. The solid electrolytic capacitor according to claim 2, wherein the joint part provided in the anode terminal binds the anode electrode part of the flat plate-like element inside by wrapping the anode electrode part from both sides.

5. The solid electrolytic capacitor according to claim 1, wherein the low ESR mechanism has a configuration in which a joint part is provided in the anode terminal to be joined with the anode electrode part such that a tip of the joint part is joined with a flat portion of the anode electrode part by laser welding, and a ratio (w/d) of a width (w) of the tip of the joint part and a diameter (d) of a welding trace in the laser welding part is 0.5 to 1.25.

6. The solid electrolytic capacitor according to claim 5, wherein the width of the tip portion of the joint part provided in the anode terminal is narrower than other portions of the joint part.

7. The solid electrolytic capacitor according to claim 5, wherein the joint part provided in the anode terminal binds the anode electrode part of the flat plate-like element inside by being wrapped about the anode electrode part from both sides.

8. The solid electrolytic capacitor according to claim 1, wherein the low ESR mechanism includes a through hole provided in a portion of the anode electrode part of the flat plate-like element, and the joint part to be joined with the flat portion of the anode electrode part is provided in the anode terminal such that part of a molten anode electrode part flows into the through hole by joining a tip of the joint part and a vicinity of the through hole provided in the anode electrode part by laser welding.

9. The solid electrolytic capacitor according to claim 8, wherein welding parts for joining the tip of the joint part provided in the anode terminal with the anode electrode part of the flat plate-like element are provided at two locations such that the through hole provided in the anode electrode part is disposed on a line linking the welding parts at the two locations.

10. The solid electrolytic capacitor according to claim 9, wherein the joint part provided in the anode terminal binds the anode electrode part of the flat plate-like element by being wrapped about the anode electrode part from both sides.

11. The solid electrolytic capacitor according to claim 8, wherein the joint part is provided in the anode terminal and binds the anode electrode part of the flat plate-like element by wrapping the anode electrode part from both sides.

12. The solid electrolytic capacitor according to claim 1, wherein the low ESR mechanism includes a joint part provided in the anode terminal for joining with the anode electrode part such that the joint part covers a portion of the insulating resin part provided between the anode electrode part and the cathode electrode part of the flat plate-like element and is joined with a flat portion of the anode electrode part, and a portion of the joint part and the flat portion of the anode electrode part are joined by laser welding.

13. The solid electrolytic capacitor according to claim 12, wherein a notch part is provided on the anode electrode part side of the tip portion of the joint part to be joined with the anode electrode part of the flat plate-like element such that the joint part and the anode electrode part are joined in the notch part.

14. The solid electrolytic capacitor according to claim 13, wherein the joint part provided in the anode terminal binds the anode electrode part of the flat plate-like element by being wrapped about the anode electrode part from both sides.

15. The solid electrolytic capacitor according to claim 1, wherein the low ESR mechanism includes notch parts on both ends of an end portion of the cathode electrode part in a direction linking the anode electrode part and the cathode electrode part of the flat plate-like element, and side wall parts contacted with side surfaces of the notch parts provided in the cathode electrode part of the flat plate-like element, the side wall parts being constituted by upwardly bent ends of an element mounting part of the cathode terminal for mounting the cathode electrode part of the flat plate-like element.

16. The solid electrolytic capacitor according to claim 15, wherein the side surfaces of the notch parts provided in the cathode electrode part of the flat plate-like element and the side wall parts provided in the element mounting part of the cathode terminal are connected electrically with a conductive adhesive.

17. The solid electrolytic capacitor according to claim 16, wherein the side surfaces of the tapered parts provided in the cathode electrode part of the flat plate-like element and the side wall parts provided in the element mounting part of the cathode terminal are connected electrically with a conductive adhesive.

18. The solid electrolytic capacitor according to claim 1, wherein the low ESR mechanism includes tapered parts on both ends of an end portion of the cathode electrode part in a direction linking the anode electrode part of the flat plate-like element, and side wall parts contacted with side surfaces of the tapered parts provided in the cathode electrode part of the flat plate-like element, the side wall parts being constituted by upwardly bent ends of an element mounting part of the cathode terminal for mounting the cathode electrode part of the flat plate-like element.

* * * * *